United States Patent [19]

Hellnick

[11] 4,281,430
[45] Aug. 4, 1981

[54] METHOD AND APPARATUS FOR MACHINING PIPE COLLARS

[75] Inventor: Dieter H. Hellnick, Houston, Tex.

[73] Assignee: Jo-Way Tool Company, Inc., Houston, Tex.

[21] Appl. No.: 67,902

[22] Filed: Aug. 20, 1979

[51] Int. Cl.³ .............................................. B23G 1/22
[52] U.S. Cl. ............................ 10/101 R; 10/107 PH; 407/113; 408/188
[58] Field of Search ................. 10/101 R, 101 D, 102, 10/107 PH; 407/113; 408/188

[56] References Cited

U.S. PATENT DOCUMENTS

| 3,262,140 | 7/1966 | Takagi et al. | 10/101 R |
| 3,613,197 | 10/1971 | Stier | 10/101 R X |
| 4,117,563 | 10/1978 | Fredd | 10/101 R |

FOREIGN PATENT DOCUMENTS

| 556562 | 8/1932 | Fed. Rep. of Germany | 10/101 R |
| 613765 | 5/1935 | Fed. Rep. of Germany | 10/101 R |

Primary Examiner—Mark Rosenbaum

[57] ABSTRACT

A method and apparatus for machining pipe collars having internally tapered coaxial threads is accomplished by providing a thread cutting tool having defined thereon a single thread groove forming tooth with first and second thread topping forming portions defined on opposite sides of the thread groove forming tooth. The first and second thread toppings are so designed and oriented with respect to the thread groove forming tooth that the first thread topping forms the top configuration of the first tapered threaded surface simultaneously with cutting the thread groove of the first tapered threaded surface. The second thread topping is so oriented with respect to the threaded groove cutting to that it remains clear of the first thread as the first threaded surface is being formed. While cutting the second tapered threaded surface during completion of a thread cutting path, the second thread topping forms the top configuration of the second thread simultaneously with cutting of the groove of the second thread by the single thread groove cutting tooth. The first thread topping is so oriented with respect to the thread groove cutting tooth as to remain clear of the second thread as the second thread is being cut. The first and second oppositely tapered internal threads of the pipe collar are formed during movement of the thread cutting tool through the pipe collar in a single thread cutting pass.

6 Claims, 7 Drawing Figures

METHOD AND APPARATUS FOR MACHINING PIPE COLLARS

FIELD OF INVENTION

This invention relates generally to machining operations pertaining to the manufacture of internally threaded pipe collars having tapered, coaxial threads and, more specifically, is directed to improved apparatus and method of manufacture whereby both of the opposed tapered threads are formed as the thread forming tool is moved in unidirectional manner through the collar or workpiece being rotated by the threading machine.

BACKGROUND OF THE INVENTION

In the manufacture of internally threaded, tapered pipe collars such as are typically utilized in the petroleum industry for pipe or tubing strings that are suspended within petroleum producing wells, it is necessary that the pipe collars be of quite accurate manufacture. For example, the opposed internally tapered threads must be coaxial within very close tolerances in order that the pipe sections joined by the collar will be coaxial and can be readily suspended within the well without interference with other pipe structures. It is also mandatory that the opposed internally tapered thread forms have a high degree of coincidence and registry one with the other. The taper, pitches and thread forms must be accurately maintained within very close tolerance limits because it is necessary that the threaded pipe joints form a positive, leak-proof seal to prevent escape of gas or liquid petroleum products from the tubing string into other portions of the well being produced. Where such tubing or pipe is employed in conventional surface supported or buried service for pipeline operations, obviously, it is desirable that the threads of the couplings and pipe joints be machined with sufficient accuracy that positive leak-free type joints will be developed simply by joining pipe sections by means of couplings.

Machining of pipe collars is a highly competitive commercial operation and machine time, labor and material savings are given careful consideration. Moreover, the complexity and productivity of the machining operation itself can quite easily enhance or materially interfere with commercially acceptable manufacture of pipe collars.

THE PRIOR ART

In the past, machines and machining operations have been designed specifically for the manufacture of accurately machined pipe collars with emphasis toward machining operations that accomplish machining and threading of both internal tapers without necessitating indexing or rechucking of the workpiece during different stages of manufacture. For example, U.S. Pat. No. 1,958,530 of Bogart and U.S. Pat. No. 3,262,140 of Takagi, et al, both show machine tool devices for machining internally tapered couplings. The Bogart patent shows a machine mechanism incorporating a pair of tool support bars that are moved linearly through a coupling that is positioned in angular relation to the path of tool movement. Machining and threading of respective tapers is accomplished by tools supported by respective ones of the pairs of tool support bars. The bars themselves are indexed 90° for machining or threading operations. In the case of Takagi, et al, opposed threading tools are supported by a bar that is also angularly oriented with respect to the collar being machined. One thread form is defined by one of the threading elements as the tool support bar is moved to the center of the coupling and then the tool support bar is shifted laterally to bring the opposite threading element into engagement with the opposite internal side of the coupling to define the other tapered thread form.

Neither of the machining and threading machines and methods disclosed by the above patents are widely used at this time in the manufacture of pipe collars for the reason that the mechanism required to accomplish such machining operations is extremely complex, quite expensive and frequently yields less than satisfactory results. It is desirable, therefore, to provide a method and apparatus for the manufacture of internally threaded pipe collars wherein the machine tools are of limited complexity from the standpoint of operation and machining, and threading operations can be carried out with minimum labor and handling.

At the present time, typical manufacture of internally tapered type pipe collars or couplings is accomplished by a machining and threading machine having an indexing chuck. The indexing chuck supports the work piece and, after one of the machining and/or threading operations is formed to define one of the tapered threads of the coupling, the workpiece is rotated 180° by the indexing chuck, thereby exposing the opposite end of the collar for machining and threading operations thereon. One of the problems with utilizing machines of this nature is that coincidence and coaxial relation between the internal opposed threads of the coupling are difficult to maintain within the limited tolerance range required by the industry. Moreover, the indexing chuck mechanism is quite expensive, and therefore detracts from the commercial feasibility of pipe collar manufacture. Also, the machinist in charge of machining operations must expend a good deal of labor in machining and handling operations and thus labor costs for such machining operations also adversely affect the commercial feasibility of such collar manufacture.

It is therefore a primary feature of the present invention to provide a novel machining and thread forming mechanism that promotes machining of both opposed tapered internal threads of pipe collars without the necessity for providing an indexing chuck for support of the work.

It is also a feature of the present invention to provide a novel mechanism for machining pipe collars wherein both of the internal opposed tapered threads of the collar can be formed while a thread forming tool is being moved through the collar in one direction.

It is a further feature of the present invention to provide a novel mechanism for machining pipe collars wherein the collar being machined can be rotated in unidirectional manner and both opposed internally tapered threads of the collar can be formed without necessitating reversal of collar rotation at the midpoint of thead forming operations.

Among the several features of the present invention is noted that contemplation of a novel mechanism for manufacturing internally threaded pipe collars wherein spaced sets of thread forming teeth may be moved through the collar in a manner tracing the desired taper of the threads being formed with the sets of threading teeth forming respective ones of the threaded tapers while the opposite set of threading teeth trace but remain clear of the thread being formed.

Another feature of this invention promotes the developement of a novel mechanism for machining pipe collars that enables registry, coincidence and aligning of the opposed internal thread forms of the collars to be maintained quite easily within narrow tolerance limits.

It is a further feature of this invention to provide a novel collar machining mechanism that is capable of functioning with less manufacturing time, less handling, better quality output and increased productivity as compared to that available with machines and methods for manufacturing collars at the present time.

Other and further objects, features and advantages of this invention will become obvious to one skilled in the art upon an understanding of the illustrative embodiments about to be described, and various advantages, not referred to herein, will occur to one skilled in the art upon employment of the invention in practice.

SUMMARY OF THE INVENTION

In one form of the invention, a numerically controlled machine is provided having at least one tool support bar, supporting a thread cutting tool having the capability of forming both of the oppositely tapered threaded surfaces of the coupling. The tool support bar of the numerically controlled machine will be maintained during threading operations in such manner that the longitudinal axis of the tool support bar remains oriented in substantially parallel relation with the axis of the collar during threading operations. In this manner, the threading tool being supported by the tool support bar is maintained in predetermined oriented relation with the axis of the collar during thread forming operations. The tool support bar is provided with at least one tool receptacle, within which is positioned a single thread forming tool element in such a manner that a single groove forming tooth is positioned by the tool support bar in thread forming position relative to the tapered surface of the collar to be threaded. The thread forming tool defines a single thread groove cutting tooth and first and second thread topping portions being defined on opposite sides of the thread groove cutting tooth. During threading operations the threading tool is fed into the rotating collar by the tool support bar, with the thread groove forming tooth of the tool being maintained in oriented and aligned relation with the axis about which the collar rotates during cutting of both tapered threads. As the threading tool is moved along the internal taper of the rotating collar by machine, the single thread groove cutting tooth will have thread cutting engagement with one of the tapered surfaces of the collar. Simultaneously, one of the thread topping portions will be presented in properly oriented manner for defining the thread topping of the tapered thread being cut. The opposite one of the thread topping portions traces but maintains a clearance with the topping of the thread being cut. After reaching the center of the collar the tool support bar is moved by the machine along the taper of the opposite side of the collar in thread cutting manner. While cutting the other one of the tapered threaded surfaces of the collar, the single thread groove forming tooth cuts the groove of the oppositely tapered thread. Simultaneously to cutting of this groove, the opposite one of the thread topping portions is oriented to form the topping configuration of the tapered thread being cut while the other thread topping portion traces but maintains noncutting clearance with the tapered thread being cut.

The single thread groove cutting tooth and adjacent thread topping portions of the threading tool are oriented so that the threading tool may be moved through the coupling in unidirectional manner and will cut both of the oppositely tapered threads of the coupling during a single thread cutting pass. To complete the thread machining operation on the coupling, the thread cutting tool will be moved along the oppositely tapered surfaces of the coupling in a plurality of thread cutting passes, each pass accomplishing removal of a portion of the metal of both tapered portions of the coupling being threaded.

The threading tool may be defined by a tool body portion of generally triangular configuration having a single thread groove cutting tooth and adjacent thread topping portions being defined at each of the three apex portions of the tool body. The tool body is also formed so as to be received in immovable relation within a tool support receptacle of a threading machine.

BRIEF DESCRIPTION OF THE DRAWINGS

In order that the manner in which the above-recited advantages and features of the present invention are attained, as well as others which will become apparent can be understood in detail, more particular description of the invention may be had with reference to the specific embodiment thereof which is illustrated in the appended drawings, which drawings form a part of this specification. It is to be understood, however, that the appended drawings illustrate only a typical embodiment of the invention and therefore are not to be considered limiting of its scope, for the invention may admit to other equally effective embodiments.

In the Drawings.

DETAILED DESCRIPTION OF PREFERRED EMBODIMENT

Figure 1:
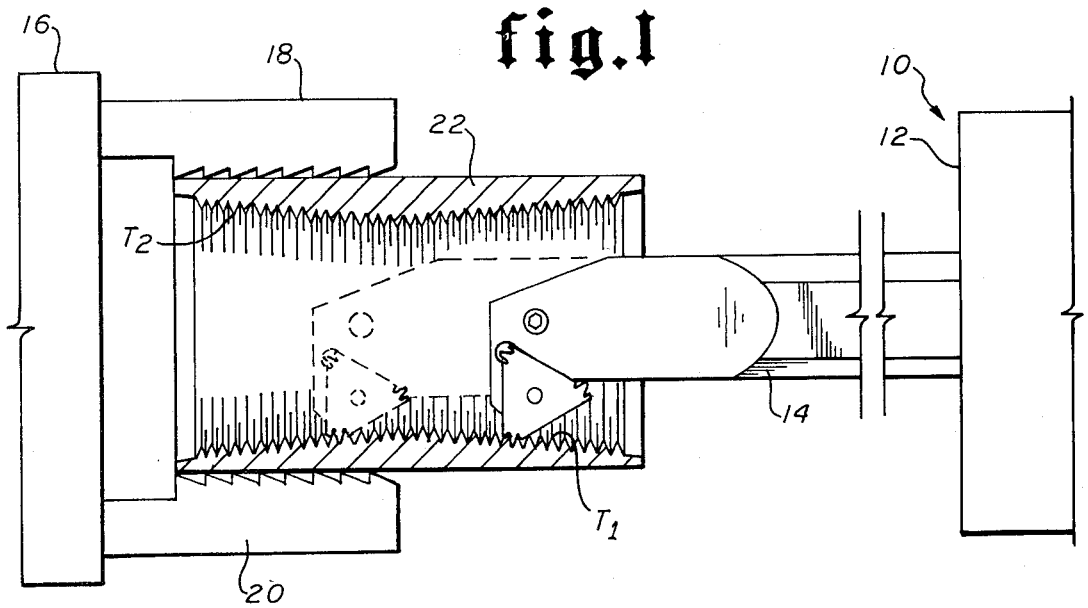
FIG. 1 is a fragmentary illustration of a machine having a movable tool support bar and having a rotatable chuck capable of supporting and rotating a work piece such as a pipe collar for threading operations within the scope of this invention and illustrating a thread cutting tool illustrated in full line as cutting one of the internally tapered threads of the coupling and illustrating in broken line cutting of the opposite internally tapered thread of the coupling.

Referring now to the drawings and first to FIG. 1 a threading machine is illustrated generally at 10 having a tool bar support structure 12 that is capable of supporting a tool bar 14 for omnidirectional movement. One suitable machine capable of providing the necessary tool movement for accomplishing internal threading of pipe collars is a commercially available numerically controlled machine, typically referred to as an N-C machine. The N-C machine 10 incorporates a conventional chuck mechanism 16 having jaws 18-20 that are capable of providing positive support for a workpiece 22 such as a pipe collar that is being machined and internally threaded from tubular stock. The chuck 16 is rotated in conventional manner, thereby rotating the workpiece or collar 22 while the tool bar 14 is moved in accordance with a predetermined computer program, thereby causing a tool carried by the cutter bar 14 to engage the inner surfaces of the workpiece and form desired machined surfaces therein. Although this invention is described herein as relating particularly to the machining of internal threads in pipe couplings, it is not intended to limit the present invention in any manner whatever. The invention is equally applicable to machining externally tapered threads on cylindrical objects as well.

In most cases, internally threaded pipe collars are manufactured by first forming the threads of a first internal taper of the threaded collar then reversing the collar by means of an indexing mechanism and subsequently machining and forming the threads at the opposite extremity of the collar. It is desirable to conduct the machining and threading operations without indexing the workpiece in this manner and without reversing the direction of rotation thereof, thus promoting simplicity of machining operations and reducing the amount of handling that is otherwise necessary during manufacture of pipe collars.

Figure 2:
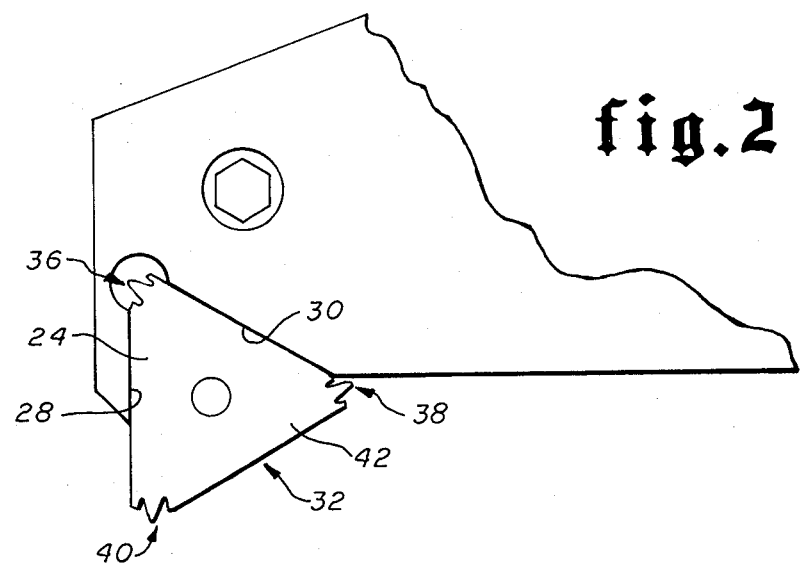
FIG. 2 is an enlarged fragmentary view of the thread cutting tool of FIG. 1 illustrating one of the thread cutting portions thereof in detail.
Figure 5:
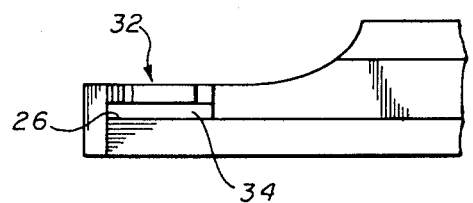
FIG. 5 is an elevational view showing the tool support bar and the thread cutting tool of FIG. 4 in position for thread cutting operations.

Referring now particularly to FIG. 2, the threading tool support bar 14 is formed to define a tool recess 24 defined by a bottom support surface 26 and a pair of tool positioning abutment surfaces 28 and 30. Within the tool recess 24 may be positioned a thread forming tool, illustrated generally at 32, which may be spaced from the bottom support surface 26 by means of a base shim 34 in the manner illustrated in FIG. 5. As shown in FIG. 2, the thread forming tool 32 may be of generally triangular configuration, defining thread cutting portions 36, 38 and 40 at each of the three apex portions of the thread forming tool. The thread cutting portions 36, 38 and 40 may be machined on a generally triangular tool body element 42, as shown. In the event different hardness requirements are intended for the body and thread cutting portions, thread forming inserts, such as carbide inserts, may be attached to a thread forming body in any suitable manner. Also, the body portion of the thread forming tool may take any other convenient form other than generally triangular as shown in the drawing.

Figure 3:
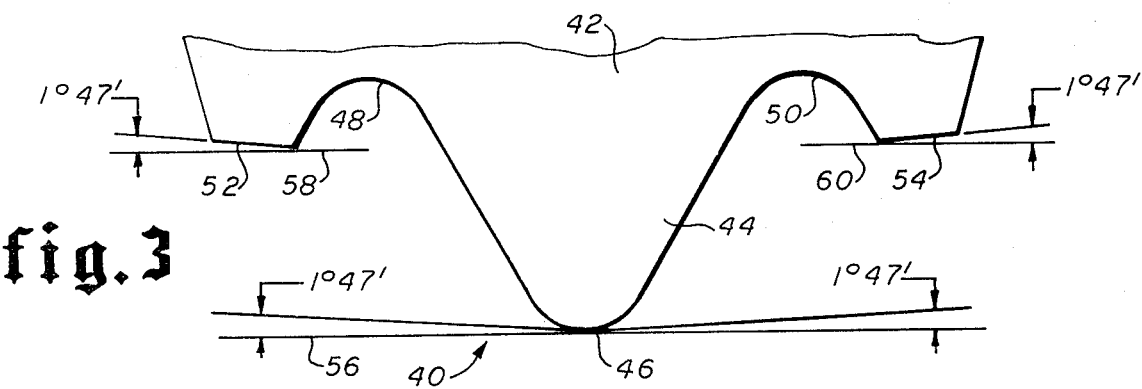
FIG. 3 is a view illustrating a thread cutting tool of generally triangular form having thread cutting portions formed at each of the three apexes of the triangular tool.
Figure 4:
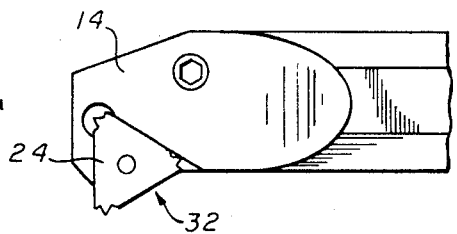
FIG. 4 is a fragmentary view of the tool support bar of the thread cutting machine illustrating a thread cutting tool such as shown in FIG. 3 being supported by the tool support bar in position for threading operations.

Referring now particularly to FIG. 3, an enlarged fragmentary view of the thread forming tool 32 is illustrated showing the thread forming portion 40 thereof in detail. The thread forming portion 40 is substantially identical with respect to thread forming portions 36 and 38, thereby providing for orientation of the thread forming tool 32 in such manner that respective ones of the thread forming portions will be positioned for threading engagement with the workpiece. As shown in FIG. 3, the thread cutting portion 40 is formed to define a single thread groove cutting tooth 44 that cuts the thread groove configuration as the pipe collar is rotated relative to the tool. The thread cutting tooth 44 is shown to define a rounded lower portion 46, presenting a rounded groove bottom configuration. This particular configuration is not intended to limit the invention in any manner whatever, it being obvious that thread designs of other configurations may be formed simply by providing the thread groove cutting tooth 44 with a proper configuration for the design of the thread to be cut.

On one side of the thread groove forming tooth 44 is provided a thread topping section 48 which is of a configuration defining the topping configuration of the thread form design being machined. The topping section may take any other convenient thread form design within the spirit and scope of the present invention. The topping portion 48 cooperates with the single thread groove cutting tooth 44 to form the first tapered portion of internally threaded collar extending from one end of the collar to the center portion thereof. This first threaded portion is referred to as T-1 in FIG. 1.

Figure 7:
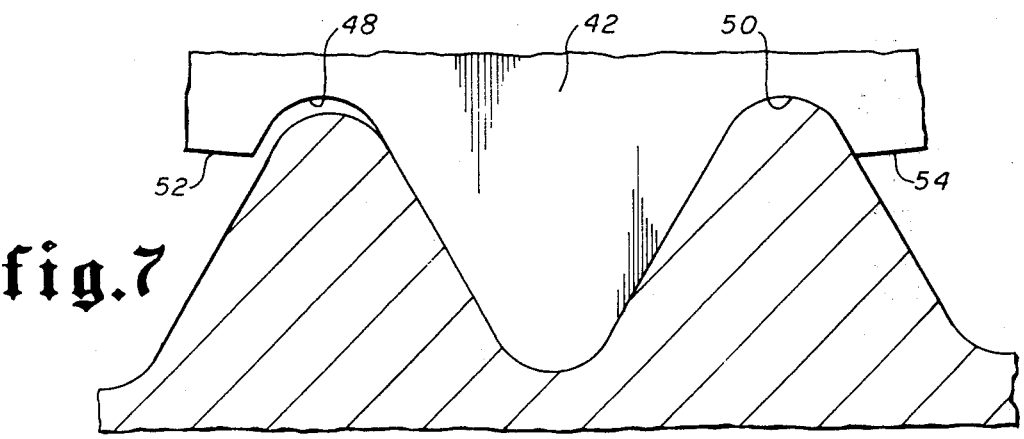
FIG. 7 is an enlarged fragmentary view of the thread cutting tool of the present invention cutting the second tapered threaded surface.
Figure 6:
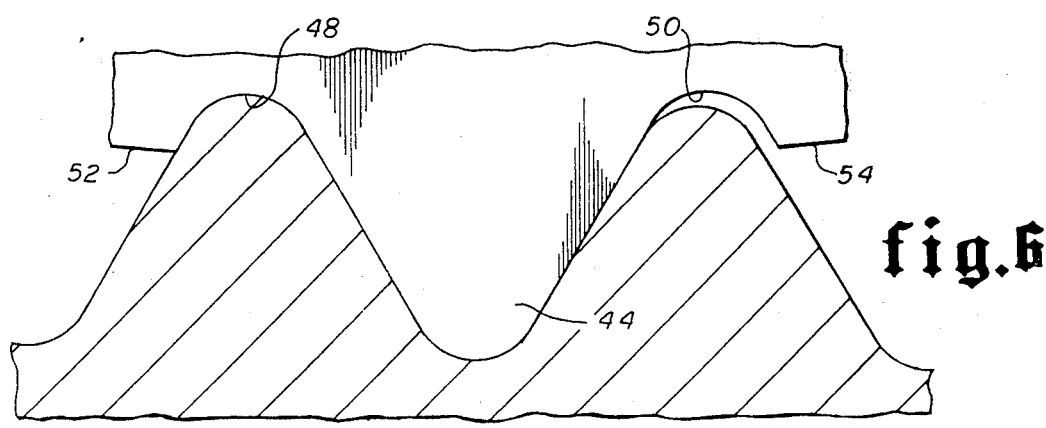
FIG. 6 is an enlarged fragmentary view of the thread cutting tool of the present invention cutting the threads of the first tapered internal surface.

On the opposite side of the thread forming tooth 44 there is provided a second thread topping portion 50 that is also of a configuration conforming to the particular thread design involved. Thread topping portion 50 cooperates with the thread groove cutting tooth 44 so as to define the thread form that is cut during threading of the oppositely tapered portion of the internally threaded coupling as shown at T-2 in FIG. 1. Topping portions 48 and 50 are oriented with respect to the thread groove forming tooth 44 so that the resulting thread being formed will be oriented properly with respect to the tapered surface on which the thread is machined. For example, in the petroleum industry, one popular type of pipe coupling is machined with apposed internal tapered threads having a taper of 1°, 47'. The thread cutting tool 42 of FIG. 3 is machined so as to define tapered threads of 1°, 47' within a tapered collar. This particular taper, however, is illustrated in FIG. 3 only for the purpose of promoting an understanding of the present invention and is not intended to limit the invention in any manner whatever. The thread cutting tool 42 is moved along the internally tapered surface of the collar which will also be 1°, 47', for example, thereby causing the tapered thread to be generated. As shown in FIG. 3, the thread forming tool is formed to define a pair of spaced surfaces 52 and 54, each being of substantially planar configuration. Also shown in FIG. 3 are lines 56, 58 and 60 that are disposed in substantially parallel relation. Lines 58 and 60 are coextensive and are parallel with horizontal line 56. As shown, surfaces 52 and 54 are tapered so as to define the particular taper of the threads being formed. For example, surfaces 52 and 54 are angulated 1° 47' with respect to horizontal lines 58 and 60. Thus, when cutting the first internal thread T-1, the thread forming tool 42 is moved upwardly along the internal taper of thread formed T-1 and surface 52 will therefore be oriented in substantially parallel relation with the taper of the thread form being cut. As the first internal thread T-1 is being cut, the thread topping portion 48 will be in cutting relation with the thread form assuming the thread form has been cut sufficiently deep that topping engagement occurs. Simultaneously, the topping portion 50 will trace the thread form being machined but will maintain a clearance therewith, as shown in FIG. 6. After the centermost portion of the thread has been reached during threading operations, the tool support bar will continue moving in unidirectional manner but will be moved downward along the internally tapered portion T-2 of the threaded collar being machined. During this movement, planar surface 54 of the threading tool 42 will be oriented in substantially parallel relation with the tapered thread form being machined and will be in cutting relation with the threads when the threads have been cut sufficiently deep that topping engagement will occur. Simultaneously, the opposite topping portion 48 will trace the thread form being cut but will maintain a clearance therewith in the manner illustrated in FIG. 7.

While the thread forming tool 42 is maintained at all times in positively supported and oriented relation with the tool support bar and the center line of the pipe collar being rotated by the machine, the thread groove forming tooth 44 and the respective thread topping portions 48 and 50 of the threading tool will be properly oriented with respect to the tapered thread portion to be formed. The tool support bar 14 of the machine, which will typically be the tool support bar of a numerically controlled machine, will move the thread cutting tool in precisely oriented relation along the internally tapered surfaces on which the threads are formed. For example, where the internal threads of a collar are formed with tapers of 1°, 47' the tool support bar will traverse completely through the collar to be machined in such a manner that a threaded surface, of 1°, 47' is formed on each oppositely tapered portion within the collar. Both internally tapered threads will be cut as the numerically controlled machine moves the thread forming tool through the collar in a single linear pass and several thread cutting passes will be required in order to form a completely machined thread. After a thread forming pass has been completed, the N-C machine will retract the thread cutting element 42 transversely in order to clear the threads and will completely withdraw the thread cutting element from the collar and reposition it at the initiating position for a subsequent thread forming pass. After the internal threads of the collar have been machined to the extent that the proper topping form is machined on each tapered thread by topping portions 48 and 50 respectively, the thread forming tool will be shifted transversely and withdrawn from the collar and the machine operation will cease unless other machining operations are to be accomplished. At this particular time, the threads will have been completely machined and will be precisely oriented with respect to one another from the standpoint of lead and pitch.

In view of the foregoing, it is clearly apparent that I have provided a method and apparatus for machining threads in tubular elements such as pipe collars which does not necessitate the use of an indexing chuck and therefore renders the method and apparatus more commercially feasible through maintenance of low cost machining operations. Moreover, machine time is effectively saved for reasons that less handling is involved and there is no necessity to reverse the direction of work piece rotation during machining operation. Moreover, in view of the fact that both internally tapered threads of the collar can be formed with simple linear passes of a thread forming tool through the work piece, it is obvious that the lead of both threads can be maintained precisely, thus providing better quality output during manufacture of the collar product. It is therefore clear that the present invention accomplishes all of the objects and features hereinabove set forth, together with other features that will be obvious from an understanding of the apparatus itself.

What is claimed is:

1. A method of machining a cylindrical workpiece having coaxial opposed first and second tapered internal surfaces to form an internally threaded pipe collar having coaxial, oppositely tapered first and second threaded surfaces, said method comprising:
   providing a threading tool having a single thread cutting tooth and having a first thread topping disposed on one side of said thread cutting tooth and a second thread topping disposed on the opposite side of said thread cutting tooth, said first and second thread toppings defining a line tangential thereto;
   continuously rotating said pipe collar to be internally threaded about the longitudinal axis thereof;
   moving said threading tool in one linear direction along said first tapered internal surface of said collar in thread cutting manner with said tangential line parallel to the axis of said collar and with said tooth cutting the thread groove and said first thread topping forming the topping of said first tapered thread, and with said second thread topping remaining clear of said topping of said first tapered thread; and
   moving said threading tool in said one linear direction along said second tapered internal surface of said collar in thread cutting manner with said tangential line parallel to the axis of said collar and with said tooth cutting the thread groove and said second thread topping forming the topping of said second tapered thread, and with said first thread topping remaining clear of said topping of said second tapered thread.

2. The method of claim 1, wherein:
said threading tool is supported by the tool support bar of a numerically controlled threading machine; and
said tool support bar is moved by said numerically controlled threading machine along the respective tapers of said first and second tapered surfaces of said pipe collar during rotation of said pipe collar and cutting both of said first and second tapered threaded surfaces in a single linear thread cutting pass.

3. The method of claim 1, wherein said method includes:
   directing said cutting tool along said first and second tapered threaded surfaces a number of times in single linear pass manner to form completed threads on said tapered threaded surfaces and retracting said cutting tool in non-cutting relation between each linear thread cutting pass.

4. A thread cutting tool for cutting threads along a work piece having first and second oppositely tapered internal surfaces, said thread cutting tool comprising:
   a tool body adapted to be supported in immovable manner by a tool support bar of a threading machine;
   a single thread groove cutting tooth being defined on said body and being oriented to cut the grooves of both of said tapered threaded surfaces;
   a first thread topping being defined on said body as one side of said thread groove cutting tooth;

a second thread topping being defined on said body on the opposite side of said thread groove cutting tooth;

said first thread topping being oriented to form the top configuration of the threads of said first tapered threaded surface during cutting of the grooves of said first tapered threads and said second thread topping being oriented to maintain non-cutting clearance during cutting of said first tapered threaded surface; and said second thread topping being oriented to form the top configuration of the threads of said second tapered threaded surface during cutting of the grooves of said tapered threaded surface and said first thread topping being oriented to maintain non-cutting clearance during cutting of said second tapered threading surface.

5. A thread cutting tool for cutting threads along a work piece, as in claim 4, wherein:
   said thread cutting tool is adapted to be supported in immovable relation by tool support means of a threading machine and to be supported in predetermined orientation with the axis of a collar being threaded during cutting of both of said oppositely tapered threads.

6. A thread cutting tool for cutting threads along a work piece as in claim 4, wherein:
   said tool body is of generally triangular configuration; and
   a single thread groove forming tooth and first and second thread toppings are defined at the three apex portions of said generally triangular body and are each adapted to be selectively positioned for thread cutting.

* * * * *